(12) United States Patent
Hopkins et al.

(10) Patent No.: US 8,166,439 B2
(45) Date of Patent: Apr. 24, 2012

(54) TECHNIQUES FOR SELECTING SPARES TO IMPLEMENT A DESIGN CHANGE IN AN INTEGRATED CIRCUIT

(75) Inventors: Jeremy T. Hopkins, Round Rock, TX (US); Thomas E. Rosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/966,043

(22) Filed: Dec. 28, 2007

(65) Prior Publication Data

US 2009/0172608 A1 Jul. 2, 2009

(51) Int. Cl.
*G06F 17/50* (2006.01)

(52) U.S. Cl. ........ 716/122; 716/129; 716/130; 716/133; 716/134; 716/136; 716/111

(58) Field of Classification Search .................. 716/2, 6, 716/9, 10, 13, 14, 122, 129, 130, 133, 134, 716/135, 136, 111
See application file for complete search history.

(56) References Cited

U.S. PATENT DOCUMENTS

| | | | |
|---|---|---|---|
| 5,426,379 A | 6/1995 | Trimberger | |
| 5,959,905 A * | 9/1999 | Payne | 365/200 |
| 6,208,907 B1 | 3/2001 | Durham et al. | |
| 6,255,845 B1 | 7/2001 | Wong et al. | |
| 6,404,226 B1 | 6/2002 | Schadt | |
| 6,425,110 B1 * | 7/2002 | Hathaway et al. | 716/2 |
| 6,446,248 B1 | 9/2002 | Solomon et al. | |
| 6,453,454 B1 * | 9/2002 | Lee et al. | 716/11 |
| 6,567,967 B2 * | 5/2003 | Greidinger et al. | 716/10 |
| 6,577,534 B2 | 6/2003 | Tsuruda | |
| 6,600,341 B2 | 7/2003 | Bingert et al. | |
| 6,622,291 B1 * | 9/2003 | Ginetti | 716/9 |
| 6,791,355 B2 | 9/2004 | Vergnes | |
| 7,308,669 B2 * | 12/2007 | Buehler et al. | 716/13 |
| 7,581,201 B2 * | 8/2009 | Kazda et al. | 716/6 |
| 7,634,743 B1 * | 12/2009 | Ginetti | 716/1 |
| 7,683,403 B2 * | 3/2010 | Tripathi | 257/202 |
| 7,853,912 B2 * | 12/2010 | Binder et al. | 716/113 |
| 7,890,905 B2 * | 2/2011 | Alpert et al. | 716/113 |
| 7,895,556 B2 * | 2/2011 | Kotecha et al. | 716/108 |
| 7,913,210 B2 * | 3/2011 | Albrecht et al. | 716/107 |
| 7,913,213 B2 * | 3/2011 | Smith | 716/113 |
| 7,921,398 B2 * | 4/2011 | Curtin et al. | 716/122 |
| 7,930,675 B2 * | 4/2011 | Levitsky et al. | 716/134 |
| 7,962,876 B2 * | 6/2011 | Oh et al. | 716/113 |
| 2002/0124230 A1 * | 9/2002 | Cai et al. | 716/6 |
| 2003/0088842 A1 * | 5/2003 | Cirit | 716/9 |
| 2004/0230924 A1 * | 11/2004 | Williams et al. | 716/2 |
| 2005/0262462 A1 * | 11/2005 | Janakiraman et al. | 716/9 |
| 2006/0031796 A1 * | 2/2006 | Meaney | 716/6 |
| 2006/0064653 A1 * | 3/2006 | Zhang et al. | 716/2 |
| 2006/0075370 A1 * | 4/2006 | Williams et al. | 716/11 |
| 2006/0265684 A1 * | 11/2006 | Buehler et al. | 716/12 |
| 2008/0237644 A1 * | 10/2008 | Tripathi | 257/202 |
| 2009/0055787 A1 * | 2/2009 | Oh et al. | 716/6 |

* cited by examiner

*Primary Examiner* — Phallaka Kik
(74) *Attorney, Agent, or Firm* — Yudell Isidore Ng Russell PLLC

(57) ABSTRACT

A technique for implementing an engineering change order includes determining spares that are available to implement a modification to a circuit design. One of the available spares is then selected to implement the modification to the circuit design based on performance criteria associated with each of the available spares.

18 Claims, 2 Drawing Sheets

TECHNIQUES FOR SELECTING SPARES TO IMPLEMENT A DESIGN CHANGE IN AN INTEGRATED CIRCUIT

BACKGROUND

1. Field

This disclosure relates generally to an integrated circuit and, more specifically, to techniques for selecting spares to implement a design change in an integrated circuit.

2. Related Art

Traditionally, circuit designers have employed circuit design and synthesis software applications (circuit design tools) to design integrated circuits (chips). Typically, circuit designers specify logical computation based on available inputs, desired outputs, and performance parameters within which a chip is required to perform. A completed chip design is defined by a set of logic components (which are capable of performing various logical functions, such as a single logical operation, for example, an AND function, an OR function, a NOT function, a NAND function, a NOR function, or an XOR function, as well as combinations of logical functions) provided in a netlist. A netlist includes a collection of components (e.g., logic components and other circuit components, such as resistors and capacitors) and an organization of the components that result from a circuit design. A logic circuit that is configured to perform one or more logical operations is commonly referred to as a gate. A gate array is a set of gates arranged in a particular manner.

When an original circuit design is complete, a circuit designer usually tests the circuit design for compliance with design parameters (specifications). For example, design specifications may include timing, gate delay, and slew rate. An original circuit design may contain errors, such as faulty logic, or fail to meet design parameters. For example, a specification may call for processor operation at 2 GHz, when a designed processor only operates correctly at 1.8 GHz. As another example, a logic component within a circuit may have a longer delay than permitted, causing a next cone of logic (i.e., logic components that are grouped together to performing a part of a logical computation) that accepts output from the logic component (as input) to produce an incorrect result.

Typically, circuit design code, which is written in a programming language (e.g., VHDL or Verilog), is used to produce sets of photolithographs, which are photographic images of all layers (i.e., semiconductor and metal layers) in a circuit design. One set of photolithographs that is used to fabricate a chip is usually referred to as a release interface tape A (RIT-A) design, which includes images of non-metallic layers used in forming a chip. Another set of photolithographs that is used to fabricate a chip is usually referred to as a release interface tape B (RIT-B) design, which includes a set of photolithographs that contain images of metallic layers of the chip that connect various circuit components. The RIT-A and RIT-B designs are used together to fabricate a designed circuit.

Occasionally, an error in a circuit design may escape detection until after an original circuit design is completed. When an error in a circuit design has occurred, a circuit designer has had to identify the error, design a logic circuit that corrects the error, and modify the original circuit design to include the logic circuit that corrects the error. The circuit designer has then tested the modified circuit design to ensure the modified circuit design actually corrects the error and meets design parameters. Unfortunately, modification of photolithographs associated with an RIT-A design is generally time-consuming and relatively expensive. As such, circuit designers have generally avoided making modifications to photolithographs included in an RIT-A design to correct an error in an original circuit design. As compared to modifying photolithographs in a RIT-A design, modifying photolithographs in an PIT-B design has generally provided a relatively inexpensive way of making modifications to a circuit design.

In an original circuit design of a chip, circuit designers have typically provided filler cells, which are areas on a chip that includes gates that do not have an assigned function in an original circuit design. That is, the filler cells are not connected in an original RIT-B design. In this manner, when an error occurs, a circuit designer may connect one or more filler cells (or portions of one or more filler cells) in a modified RIT-B design to connect logic components required in a modified circuit design. In general, circuit design tools are also used to produce modified circuit designs, in the form of an original RIT-A design and a modified RIT-B design, based on code that describes the modified circuit design.

SUMMARY

According to one aspect of the present disclosure, a technique for implementing an engineering change order (ECO) includes determining spares (disconnected circuits) that are available to implement a modification to a circuit design. One of the available spares is then selected to implement the modification to the circuit design based on performance criteria associated with each of the available spares. It should be appreciated that using spares for certain ECOs preserves gate arrays (provided in filler cells) for later ECOs. Moreover, as gates provided by filler cells are usually inferior to gates provided by spares, using spares to implement an ECO generally provides a higher-performance circuit design.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
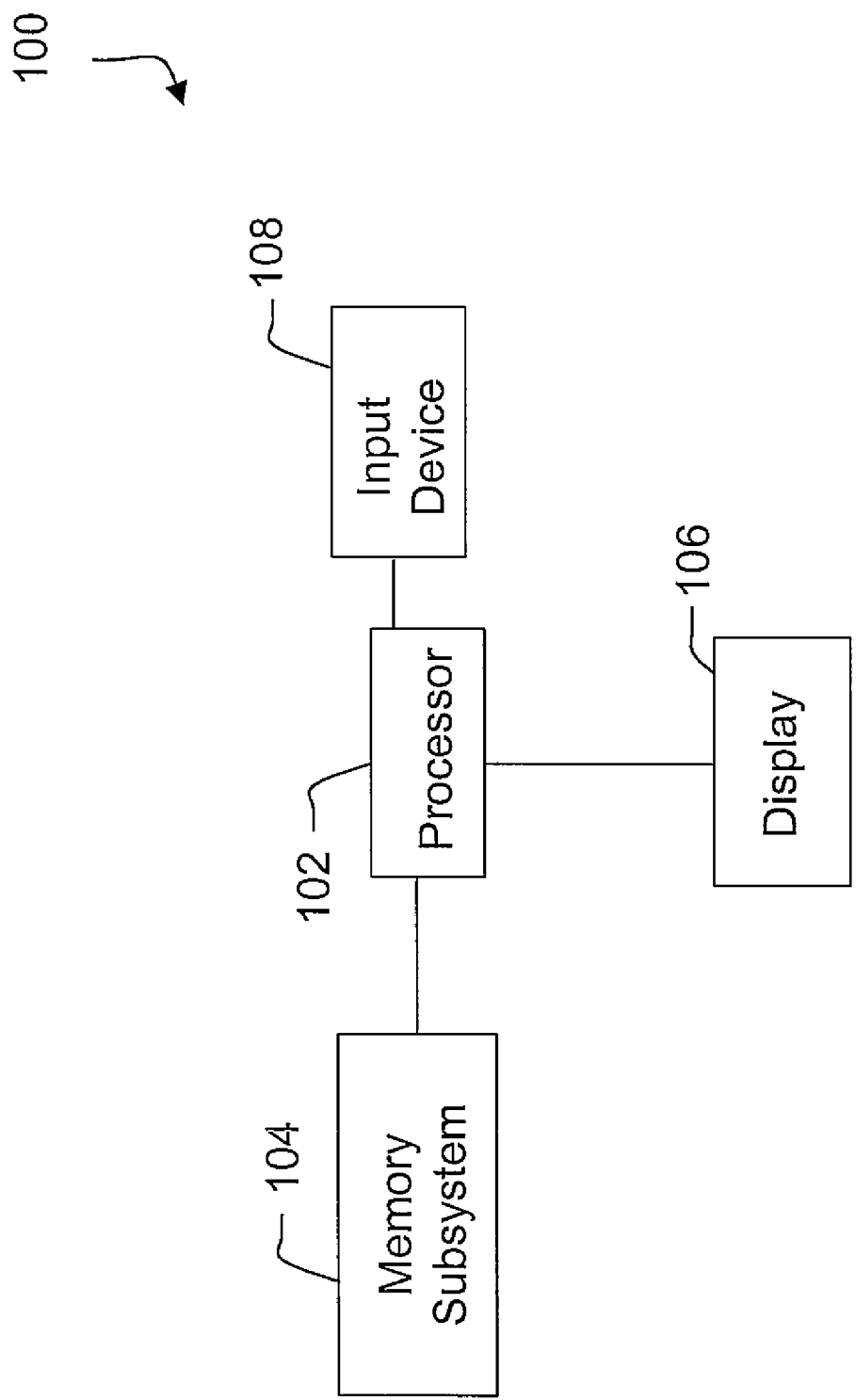
FIG. 1 is a diagram of an example computer system that may be employed to execute a circuit design tool.

As will be appreciated by one of ordinary skill in the art, the present invention may be embodied as a method, system, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium storage would include the following: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus implement the functions/acts specified in the flowchart and/or block diagram block or blocks. As used herein, the term "coupled" includes both a direct electrical connection between blocks or components and an indirect electrical connection between blocks or components achieved using intervening blocks or components.

According to one embodiment of the present disclosure, a technique for implementing an engineering change order (ECO) includes determining spares that are available to implement a modification to a circuit design. One of the available spares is then selected to implement the modification to the circuit design based on performance criteria associated with each of the available spares.

According to one aspect of the present disclosure, a computer-readable storage medium includes first code for determining spares that are available to implement a modification to a circuit design. The computer-readable storage medium also includes second code for selecting one the available spares to implement the modification to the circuit design based on performance criteria associated with each of the available spares.

According to various aspects of the present disclosure, techniques are employed to reduce costs associated with implementing an ECO in an integrated circuit (chip) design. According to the present disclosure, an original circuit design may be manually or automatically corrected based on input provided by a circuit designer. In either case, a part of a circuit design reflected in an RIT-A design includes a netlist that defines a layout of circuit components in non-metallic layers of a chip. In general, an RIT-A design includes information about specific points in a circuit design called hooks (or anchor points). Hooks are locations in the circuit design where certain signals are available, and certain components are accessible. For example, a hook may be a point of connection in a circuit where a specific output signal of a logic computation is available. When a subsequent logic computation has an error in an original circuit design, a hook can serve as an input to a replacement logic circuit that corrects the error.

A part of the circuit design reflected in an RIT-B design includes a netlist that defines a layout of circuit components in metallic layers of a chip. The netlist for the RIT-B design includes information about spares that can be formed into logic circuits. In various embodiments, a circuit design tool is also configured to accept logic correction code. Logic correction code can be provided in various forms (e.g., logic correction code that a circuit designer writes or code generation software produces based on instructions from the circuit designer). In general, logic correction code only pertains to the logic circuit that is needed to correct an identified error in an original (or current) circuit design.

Using logic correction code, the RIT-A design, and the RIT-B design, the tool identifies hooks in the original circuit design where the logic circuit described in the logic correction code can be implemented. For example, the logic correction code may specify hooks, or the RIT-A design and the RIT-B design may mark hooks. Hooks can be computed based on other criteria, such as by specifying a point in the circuit, where a specific output or a logical value is present. The tool then produces a modified RIT-B design. In producing the modified RIT-B design, the tool utilizes the information about hooks from RIT-A design and outputs a modified circuit design. The tool uses the metallic layer information and information about the spares to synthesize gates needed for implementing logic correction code.

An RIT-A and RIT-B design may also include information about gates that were originally present in the design but for one reason or another were disconnected. For example, a circuit designer may disconnect parts of a circuit for a variety of reasons, such as redesign, eliminated functionality, and/or a changed specification. A disconnected part may include components, such as gates, that are no longer used in the circuit. Some of these gates may have their inputs and outputs situated in a manner that makes the reuse of the gates for a later modification convenient. A component situated in this manner in a disconnected part of a design is referred to herein as a 'spare'.

The tool may reuse one or more spares or portions of the one or more spares (disconnected components, gates, and other disconnected parts of the circuit) to implement an ECO.

For example, the tool may determine that a NAND gate is needed in the synthesis of the modified circuit design according to the logic correction code. For example, a disconnected NAND gate available in the RIT-A design can be connected in the modified circuit design. Alternatively, when a spare is not available, a circuit designer can fabricate a NAND gate by converting one or more filler cells into a NAND gate through changes in the metallic layers in the RIT-B design. In either case, the modified logic is stitched (integrated) into an original (or current) circuit design in order to achieve a desired correction in the logic of the overall circuit.

The tool may then be used by the circuit designer to test the modified circuit design to determine any adverse effects of the modification on other parts of the circuit design. A circuit designer may also test the modified circuit design to determine whether the overall modified characteristics of the modified circuit design meet design parameters. Depending on the results of the testing, a circuit designer can make further modifications to ensure compliance with design parameters. The RIT-B photolithographs containing the modified design and the previously available RIT-A photolithographs can then be used to fabricate a chip that meets performance requirements. As generation of photolithographs is manufacturing process specific, a particular nomenclature used in a specific manufacturing process may differ from the nomenclature of RIT-A and RIT-B designs described herein. However, the concept of grouping non-metallic and metallic layers photolithographs is a common practice in the semiconductor industry.

According to various aspects of the present disclosure, a design change is implemented using gates provided by one or more disconnected circuits (spares), depending on which spare or spares provide a lower overall cost. In the event that a gate is not available in a spare, a filler cell may be employed to provide the gate. In general, filler cell placement is random, while spare placement is frequently in an area of an ECO. Moreover, gates of filler cells generally have lower drive capability than gates of spares. In a typical chip, when a spare is created (i.e., when a circuit is disconnected), the spare is generally not deleted in a RIT-B design. As such, the spare continues to occupy chip area. In this case, recycling the spare to implement a modification to an original circuit design recaptures chip area, while conserving filler cells for later ECOs.

According to various aspects of the present disclosure, a number of performance criteria are employed to determine which spare is selected for a given ECO. For example, a spare may be selected based on a distance from sources and sinks, timing slack associated with the spare, slew associated with the spare, and area saved by using the spare. It should be appreciated that other performance criteria may also be employed. In various embodiments, the performance criteria are weighted according to a design. An example, spare selection formula is set forth below:

$$\text{Spare\_select} = 0.2A + 0.3B + 0.4C + 0.1D$$

where 'A' corresponds to a distance of an evaluated spare from sources and sinks, 'B' corresponds to timing slack associated with the evaluated spare, 'C' corresponds to a slew associated with the evaluated spare, and 'D' corresponds to area saved by using the spare. In the above formula, a spare with the highest Spare_select value is chosen as the spare to employ for a given ECO.

In the example above, the most important criteria (as indicated by an associated weight) is the slew associated with the evaluated spare. It should be noted that the weights applied to the performance criteria 'A', 'B', 'C', and 'D', are example weights and that other weights may be implemented based on a given application. For example, all of the weights may be selected to have the same value when all of the performance criteria are equally important. In a typical case, the performance criteria range from zero to one. It should be appreciated that the performance criteria may have a different range and that the ranges may be different for the different performance criteria. It should be appreciated gates with more than a required number of inputs may be utilized to produce a gate having a desired number of inputs. For example, a two-input NAND gate may be created from a three-input NAND gate by tying an input of the three-input NAND gate to another input of the three-input NAND gate. In a typical implementation, spare selection is performed prior to initial placement of RIT-B ECO logic into an associated netlist. In general, spare selection according to the present disclosure facilitates the implementation of relatively large ECOs. In a typical case, any of the ECOs that cannot be implemented using spares can be implemented using gates from a filler cell.

With reference to FIG. 1, an example computer system 100 is illustrated that may be configured to execute a circuit design tool configured to select spares for implementing ECOs configured according to various embodiments of the present disclosure. The computer system 100 includes a processor 102 that is coupled to a memory subsystem 104, a display 106, and an input device 108. The processor 102 may, for example, be designed to include one or more spares according to the present disclosure. The memory subsystem 104 includes an application appropriate amount of volatile memory (e.g., dynamic random access memory (DRAM)) and non-volatile memory (e.g., read-only memory (ROM)). The display 106 may be, for example, a cathode ray tube (CRT) or a liquid crystal display (LCD). The input device 108 may include, for example, a mouse and a keyboard. The processor 102 may also be coupled to one or more mass storage devices, e.g., a compact disc read-only memory (CD-ROM) drive.

Figure 2:
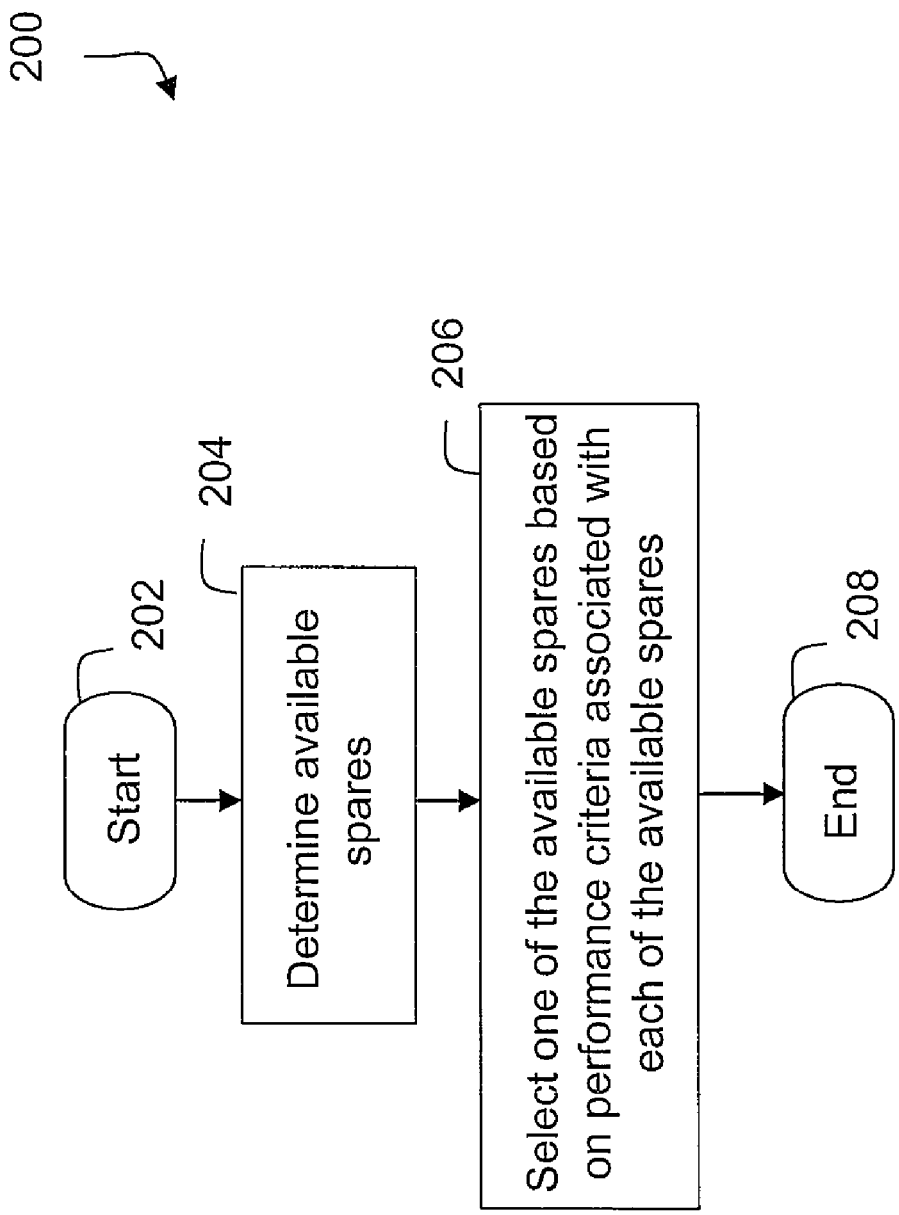
FIG. 2 is a flowchart of an example process for selecting a spare for an engineering change order (ECO), according to one embodiment of the present disclosure.

With reference to FIG. 2, an example process 200 for implementing an ECO, according to one or more aspects of the present disclosure, is illustrated. The process 200 may execute, for example, on the computer system 100, which may be a server, a desktop computer, a laptop computer, a workstation, etc. The process 200 is initiated in block 202, at which point control transfers to block 204. In block 204, the process 200 determines spares that are available to implement a modification to a circuit design. Next, in block 206, one of the available spares is selected based on performance criteria associated with the available spares. For example, the performance criteria may correspond to a distance of an evaluated spare (included in the available spares) from sources and sinks, timing slack associated with the evaluated spare, slew associated with the evaluated spare, and chip area saved by using the spare. Following block 206 the process 200 terminates in block 208. Accordingly, techniques have been disclosed herein that generally reduce costs associated with integrated circuit design changes.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. In a data processing system, a method of implementing an engineering change order for a circuit design, the method comprising:
   receiving an engineering change order;
   determining spares that are available to implement a modification to a circuit design associated with the engineering change order, wherein the spares are disconnected logic circuit components within a circuit design, which components have inputs and outputs situated in a manner that enables the use of the component for a later modification of the circuit design and the components continue to occupy chip area;
   selecting, by the data processing system, one of the available spares to implement the modification to the circuit design based on:
      an overall cost associated with each of the available spares; and
      a performance criteria associated with each of the available spares, wherein said performance criteria is based on parameters comprising one or more of the following performance aspects: (a) a distance from sources and sinks; (b) timing slack associated with the spare; (c) slew associated with the spare; and (d) area saved by using the spare, and wherein said one or more of said performance aspects are specifically weighted according to characteristics of said circuit design and a particular application;
   integrating modified logic comprising the selected spare from the available spares into an existing circuit design in order to achieve a desired correction in a logic of an overall circuit design; and
   in response to determining the engineering change order to the circuit design is not capable of being implemented using spares, implementing the engineering change order utilizing gates from a filler cell of the circuit design.

2. The method of claim 1, wherein the performance criteria corresponds to a distance of an evaluated spare, included in the available spares, from a source and a sink.

3. The method of claim 1, wherein the performance criteria corresponds to timing slack associated with an evaluated spare, included in the available spares.

4. The method of claim 1, wherein the performance criteria corresponds to a slew associated with an evaluated spare, included in the available spares.

5. The method of claim 1, wherein the performance criteria corresponds to chip area saved by using an evaluated spare, included in the available spares.

6. The method of claim 1, wherein the performance criteria corresponds to a distance of an evaluated spare, included in the available spares, from sources and sinks, timing slack associated with the evaluated spare, slew associated with the evaluated spare, and chip area saved by using the spare, and the performance criteria are weighted.

7. The method of claim 1, further comprising:
   weighting the performance criteria associated with each of the available spares according to the particular circuit design required, wherein each of the one or more performance criteria are assigned a specific weight relative to other performance criteria;
   calculating a spare select value for each spare available for selection by utilizing a spare selection formula that utilizes weighted values of each performance criteria of the one or more performance criteria; and
   choosing a spare from among available spares based on the spare select value calculated for each available spare.

8. The method of claim 7, wherein the calculating the spare select value comprises summing the products of each performance criterion multiplied by a corresponding weighted value of that performance criterion.

9. The method of claim 8, further comprising choosing the spare with a highest spare select value as the spare to employ for a given engineering change order.

10. The method of claim 1, further comprising: in response to evaluation of a spare candidate indicating that a timing slack on a path is worse than a critical slack in an associated macro, removing the spare candidate from further consideration for inclusion in a modified circuit design.

11. A computer program product comprising:
    a non-transitory computer-readable storage medium; and
    program code on said non-transitory computer readable storage medium that when executed within a data processing device, said program code provides the functionality of:
       receiving an engineering change order;
       determining spares that are available to implement a modification to a circuit design associated with the engineering change order, wherein the spares are disconnected logic circuit components within a circuit design, which components have inputs and outputs situated in a manner that enables the use of the component for a later modification of the circuit design and the components continue to occupy chip area;

selecting one of the available spares to implement the modification to the circuit design based on:
  an overall cost associated with each of the one of the available spares; and
  a performance criteria associated with each of the available spares, wherein said performance criteria is based on parameters comprising one or more of the following performance aspects: (a) a distance from sources and sinks; (b) timing slack associated with the spare; (c) slew associated with the spare; and (d) area saved by using the spare, and wherein said one or more of said performance aspects are specifically weighted according to characteristics of said circuit design and a particular application;

integrating modified logic selected spare from the available spares into an existing circuit design in order to achieve a desired correction in a logic of an overall circuit design; and in response to determining the engineering change order to the circuit design is not capable of being implemented using spares, implementing the engineering change order utilizing gates from a filler cell of the circuit design.

12. The computer program product of claim 11, wherein the performance criteria corresponds to a distance of an evaluated spare, included in the available spares, from a source and a sink.

13. The computer program product of claim 12, wherein the performance criteria corresponds to timing slack associated with an evaluated spare, included in the available spares.

14. The computer program product of claim 13, wherein the performance criteria corresponds to a slew associated with an evaluated spare, included in the available spares.

15. The computer program product of claim 14, wherein the performance criteria corresponds to chip area saved by using an evaluated spare, included in the available spares and the performance criteria are weighted.

16. The computer program product of claim 11, further comprising program code that provides the functionality of:
  weighting the performance criteria associated with each of the available spares according to the particular circuit design required, wherein each of the one or more performance criteria are assign a specific weight relative to other performance criteria;
  calculating a spare select value for each spare available for selection by utilizing a spare selection formula that utilizes weighted values of each performance criteria of the one or more performance criteria; and
  choosing a spare from among available spares based on the spare select value calculated for each available spare.

17. The computer program product of claim 16, wherein:
  the program code for performing the function of calculating the spare select value comprises program code for summing the products of each performance criterion multiplied by a corresponding weighted value of that performance criterion; and
  the program code for choosing a spare from among available spares further comprises program code for choosing the spare with a highest spare select value as the spare to employ for a given engineering change order.

18. The computer program product of claim 11, further comprising program code for:
  in response to evaluation of a spare candidate indicating that a timing slack on a path is worse than a critical slack in an associated macro, removing the spare candidate from further consideration for inclusion in a modified circuit design.

* * * * *